UNITED STATES PATENT OFFICE.

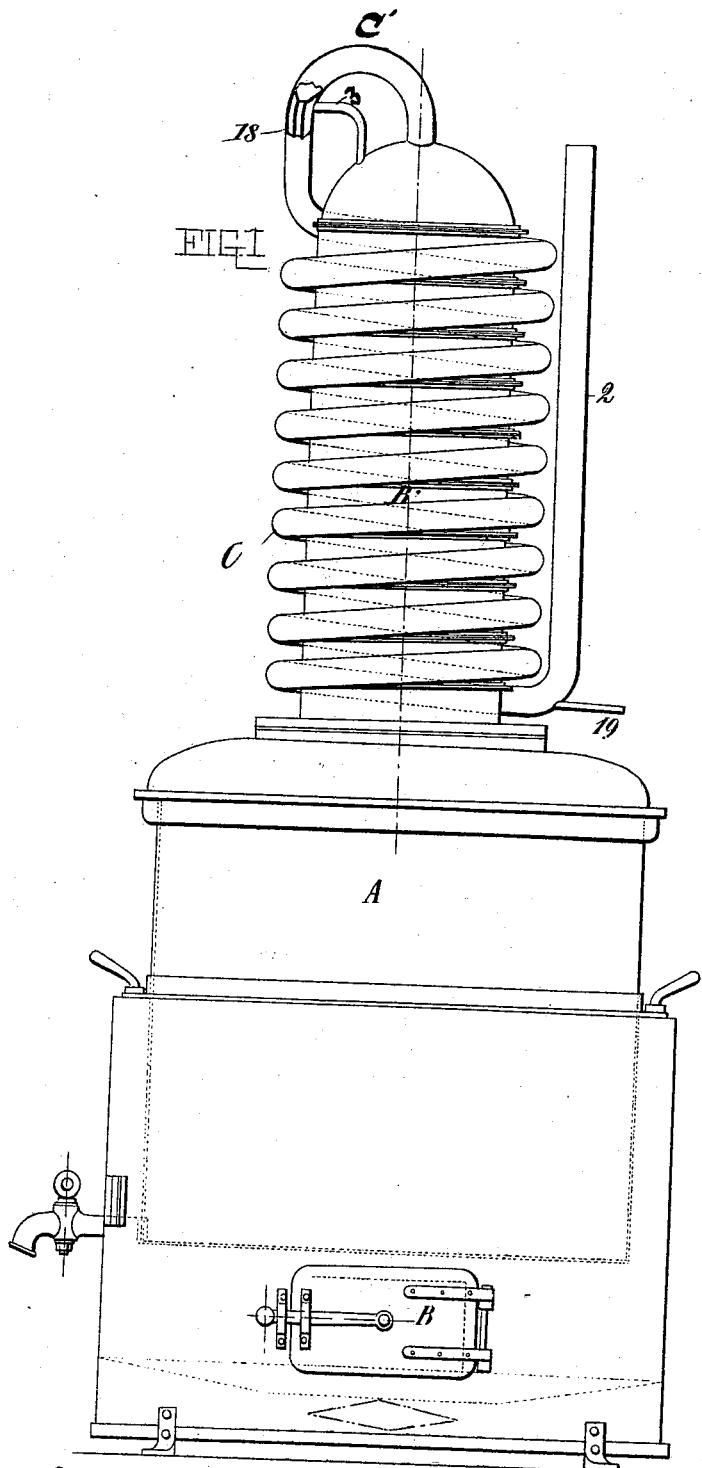

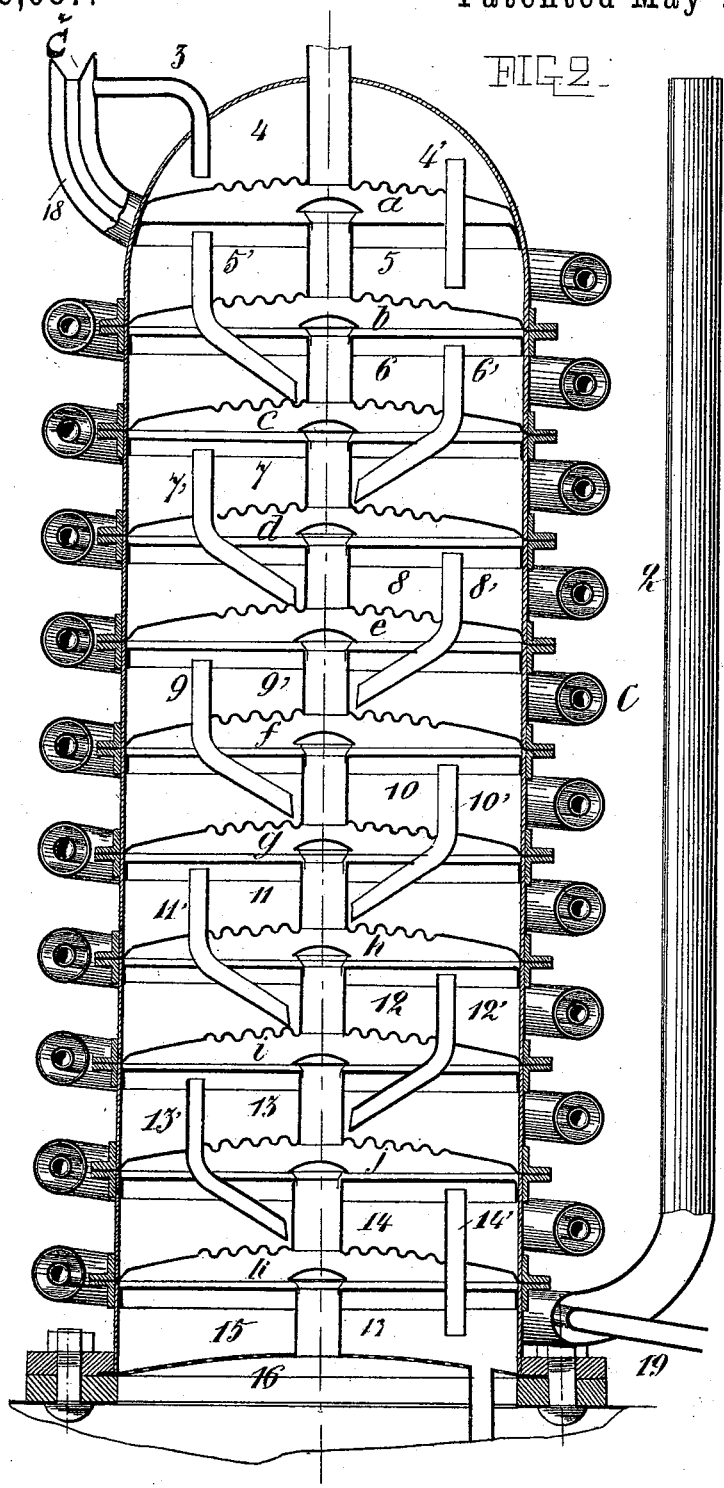

ALPHONSE LAVY, OF PARIS, FRANCE, ASSIGNOR TO THE SOCIETY LEPAGE & CIE., OF SAME PLACE.

DISTILLING APPARATUS.

SPECIFICATION forming part of Letters Patent No. 519,087, dated May 1, 1894.

Application filed October 27, 1893. Serial No. 489,294. (No model.) Patented in France November 26, 1892, No. 225,943.

*To all whom it may concern:*

Be it known that I, ALPHONSE LAVY, a citizen of the Republic of France, residing at Paris, France, have invented certain new and useful Improvements in Distilling Apparatus, (for which I have obtained Letters Patent in France, No. 225,943, dated November 26, 1892,) of which the following is a specification.

The object of my invention is to provide a new and improved distilling apparatus, which is simple in construction and economical in use.

In the accompanying drawings, Figure 1 is a front elevation of my improved distilling apparatus. Fig. 2 is an enlarged detail vertical sectional view of the rectifier.

Similar letters and figures of reference indicate corresponding parts.

My apparatus is composed of a still or boiler A, mounted over a furnace or heating apparatus of any suitable kind, having the door B. On the top of the boiler or still, the rectifier B' is mounted, which is divided into a number of chambers, according to the degree to which the alcohol is to be rectified. The liquid to be treated, for example wine, &c., passes through the tube 2 from a tank or vat containing the same. From said tube 2 it passes into the lower end of a helically wound tube or worm C, which surrounds the cylindrical rectifying vessel B' and the said liquid circulates and passes through the tubular space between the walls of said worm C, and an inner tube 18 arranged within said helically wound tube or worm C.

The liquid to be treated passes from the upper part of the helically wound tube or worm C through the tube 3 into the first or upmost chamber 4 of the rectifier B' and from said chamber 4 it passes through the tube 4' into the chamber 5 next below the chamber 4 and from the same through the tube 5' into the next lower chamber and so on, until it finally arrives in the bottom chamber 15, the bottom or floor 16 of which is provided with numerous perforations to permit the liquid to pass into the boiler A upon which the rectifier rests. The alcoholic vapors which are generated in the boiler pass up through the central tube 17 in the lowest compartment 15 and successively pass into and expand in the chambers $k, j, i, h, g, f, e, d, c, b, a$. In thus passing through the several chambers the alcoholic vapors transmit part of their heat to the wine or other liquid to be distilled and passing through the chambers 15, 14, &c., whereby a partial condensation of the alcohol is produced, which condensed alcohol passes back into the boiler through the central tube 17. Those vapors of alcohol that have passed through the several chambers without being condensed arrive at the top chamber $a$ and pass from the same through the large curved top pipe C', from which they pass by means of a funnel-shaped conductor $C^2$, located above the tube 3 into the upper end of the pipe 18, which forms a coil within the helically wound tube or worm C. During the passage of the vapors through the coil 18, in a counter-current to the liquid in the worm C they are condensed and delivered in a liquid state into the pipe 19.

My distilling apparatus is thus so constructed that the alcoholic vapors from the time they leave the boiler until they are withdrawn through the tube 19 are at all times surrounded by wine or another liquid to be distilled, so that the alcoholic vapors in being condensed heat the wine or other liquid to a certain degree before it passes into the boiler and the wine or liquid, while being thus heated, condenses the alcoholic vapors.

Having thus described my invention, I claim as new and desire to secure by Letters Patent—

A rectifying apparatus divided into a series of superposed closed chambers, arranged alternately for receiving the liquid to be distilled and the alcoholic vapors, and so that a chamber for receiving the alcoholic vapors is always between two chambers for receiving the liquid, there being a communication between the several vapor-chambers and likewise a communication between the several liquid-chambers, a helically wound tube surrounding the apparatus, and in communication with the uppermost liquid-chamber, and a coil arranged within said helically wound tube and in communication with the uppermost vapor-chamber, substantially as set forth.

In testimony whereof I have signed this specification in the presence of two subscribing witnesses.

ALPHONSE LAVY.

Witnesses:
 CLYDE SHROPSHIRE,
 JOSEPH LACOSTE.